(12) United States Patent
Ganzinga et al.

(10) Patent No.: US 9,068,550 B2
(45) Date of Patent: Jun. 30, 2015

(54) FLOATING ASSEMBLY FOR GENERATING ENERGY FROM SEA CURRENTS

(75) Inventors: Willem Sievert Ganzinga, Beverwijk (NL); Robert Kamp, Hoofddorp (NL); Anne Lourens Sijtstra, Heiloo (NL)

(73) Assignee: Bluewater Energy Services B.V., Hoofddorp (NL)

( * ) Notice: Subject to any disclaimer, the term of this patent is extended or adjusted under 35 U.S.C. 154(b) by 341 days.

(21) Appl. No.: 13/500,406

(22) PCT Filed: Oct. 5, 2009

(86) PCT No.: PCT/EP2009/062881
§ 371 (c)(1),
(2), (4) Date: Jul. 19, 2012

(87) PCT Pub. No.: WO2011/042039
PCT Pub. Date: Apr. 14, 2011

(65) Prior Publication Data
US 2012/0274073 A1    Nov. 1, 2012

(51) Int. Cl.
*F03B 13/10*    (2006.01)
*F03B 13/12*    (2006.01)
(Continued)

(52) U.S. Cl.
CPC .................. *F03B 13/10* (2013.01); *F03B 17/06* (2013.01); *Y02E 10/22* (2013.01); *Y02E 10/28* (2013.01); *Y02E 10/38* (2013.01)

(58) Field of Classification Search
CPC .......... F03B 13/10; F03B 17/06; F03B 13/16; Y02E 10/38; Y02E 10/22; Y02E 10/28
USPC .......................................... 290/53, 54, 42, 43
See application file for complete search history.

(56) References Cited

U.S. PATENT DOCUMENTS 4,590,386 A     5/1986   Wiggs
7,438,504 B2 *  10/2008  Henriksen .................. 405/223.1
(Continued)

FOREIGN PATENT DOCUMENTS

GB    2441822      3/2008
JP    S63-055370   3/1998
(Continued)

OTHER PUBLICATIONS

Notice of Reasons for Rejection for corresponding Japanese Application No. 2012-532462, drafted Oct. 9, 2013.
International Search Report and Written Opinion of the European Patent Office Patent Office in counterpart foreign application No. PCT/EP2009/062881 filed Oct. 5, 2009.

*Primary Examiner* — Javaid Nasri
(74) *Attorney, Agent, or Firm* — Steven M. Koehler; Westman, Champlin & Koehler, P.A.

(57) ABSTRACT

An assembly for generating energy from sea currents comprises a main floating body to be oriented across the direction of the sea current, a rotor assembly depending from the main floating body, at least one stabilising member extending substantially sideways from the main floating body and mooring lines for anchoring the assembly. Each stabilizing member is attached to the main floating body at a position substantially corresponding with the position of attachment of a mooring line. Further an assembly for generating energy from sea currents comprises a main floating body to be oriented in parallel to the direction of the sea current, at least two outriggers extending substantially sideways in opposite directions from the main floating body, a rotor assembly depending from the outrigger means and mooring lines for anchoring the assembly. The mooring lines are attached to the main floating body at or near the opposite frontal ends thereof.

17 Claims, 2 Drawing Sheets

(51) Int. Cl.
*H02P 9/04* (2006.01)
*F03B 17/06* (2006.01)

(56) References Cited

U.S. PATENT DOCUMENTS

| | | | |
|---|---|---|---|
| 7,541,688 | B2 | 6/2009 | Mackie |
| 8,668,452 | B2 * | 3/2014 | Henriksen ........................ 416/85 |
| 2008/0116692 | A1 | 5/2008 | Lagstrom |
| 2010/0074750 | A1 | 3/2010 | Henriksen |

FOREIGN PATENT DOCUMENTS

| | | |
|---|---|---|
| JP | 2009-114904 | 5/2009 |
| WO | WO 2004/104411 | 12/2004 |
| WO | WO 2006/054084 | 5/2006 |
| WO | WO 2006/071142 | 7/2006 |
| WO | WO 2008/100157 | 8/2008 |

* cited by examiner

FLOATING ASSEMBLY FOR GENERATING ENERGY FROM SEA CURRENTS

CROSS-REFERENCE TO RELATED APPLICATION

The present application is a national stage filing of International patent application Serial No. PCT/EP2009/062881, filed Oct. 5, 2009, and published as WO 2011/042039 in English.

BACKGROUND

The discussion below is merely provided for general background information and is not intended to be used as an aid in determining the scope of the claimed subject matter.

Aspects of the invention relate to assemblies for generating energy from sea currents. Specifically, in a first aspect the invention relates to such assemblies for generating energy from sea currents comprising a main floating body to be oriented across the direction of the sea current, rotor assemblies depending from (supported by) said main floating body, at least one stabilising member extending substantially sideways from the main floating body and mooring lines for anchoring the assembly.

The rotor assemblies are driven by the sea currents and, for example, activate appropriate generators. However, such rotor assemblies also experience drag forces striving to rotate the main floating body around a horizontally extending axis. Such a rotation would be detrimental for the operational efficiency of the assembly, and is counteracted by at least one (and often more than one) stabilising member which typically is located halfway the length of the main floating body.

Although such a stabilising member effectively reduces drag induced rotations of the main floating body, due to its mass and area it also causes severe bending stresses in said main floating body when the latter is subjected to reciprocating movements caused by waves, among others. These bending stresses require a stronger and thus heavier main floating body.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background. In a first aspect the invention provides an assembly for generating energy from sea currents comprising a main floating body to be oriented across the direction of the sea current, rotor assemblies depending from (supported by) said main floating body, at least one stabilising member extending substantially sideways from the main floating body and mooring lines for anchoring the assembly. Each stabilising member is attached to the main floating body at a position substantially corresponding with the position of attachment of a mooring line.

As a result the bending stresses in the main floating body may be reduced dramatically because the location where forces caused by the stabilising member are introduced into the main floating body coincides with the location where forces caused by the respective mooring line are introduced into the main floating body. As a further advantage the stabilising member may be used as a constructive member which is part of the means for attaching the mooring line to the main floating body, such that the overall constructional complexity and weight of the main floating body may be reduced further.

In one embodiment, the assembly comprises at least two stabilising members which, for example, are positioned at the same side of the main floating body. When, indeed, the stabilising members are positioned at the same side of the main floating body, the opposite side remains free from obstructions and is accessible for vessels, such as a maintenance vessel.

Such stabilising members positioned at the same side of the floating body function on the basis of gravity (when lifted) and on the basis of buoyancy (when submerged), depending on the rotational sense of the movement of the main floating body.

It is possible that at least one (additional) mooring line is directly attached to a stabilising member, for example at the outer end thereof remote from the main floating body.

The assembly may be used in combination with substantially all known types of rotor assemblies, e.g. a rotor having a vertical axis of rotation for the rotating member or a rotor having a horizontal axis of rotation for the rotating member.

In a second aspect the invention relates to an assembly for generating energy from sea currents, comprising a main floating body to be oriented in parallel to the direction of the sea current, at least two outriggers extending substantially sideways in opposite directions from the main floating body, rotor assemblies depending from (supported by) said outriggers and mooring lines for anchoring the assembly, wherein said mooring lines are attached to the main floating body at or near the opposite frontal ends thereof.

According to this second aspect of the invention the main floating body acts itself as stabilising member, whereas the outriggers act as support for the rotor assemblies. In such an embodiment of the assembly the overall width (determined by the length of the outriggers) will be limited compared to the more conventional construction in which the main floating body is oriented across the direction of the sea current. As a result the few mooring lines attached (near) to the opposite frontal ends of the main floating body generally will be sufficient to ensure the correct position of the assembly under all circumstances.

Also in this instance the assembly may be used in combination with substantially all known types of rotor assemblies, e.g. a rotor having a vertical axis of rotation for the rotating member or a rotor having a horizontal axis of rotation for the rotating member.

BRIEF DESCRIPTION OF THE DRAWINGS

Hereinafter aspects of the invention will be elucidated while referring to the drawing, in which.

DETAILED DESCRIPTION OF THE ILLUSTRATIVE EMBODIMENTS

Figure 1:
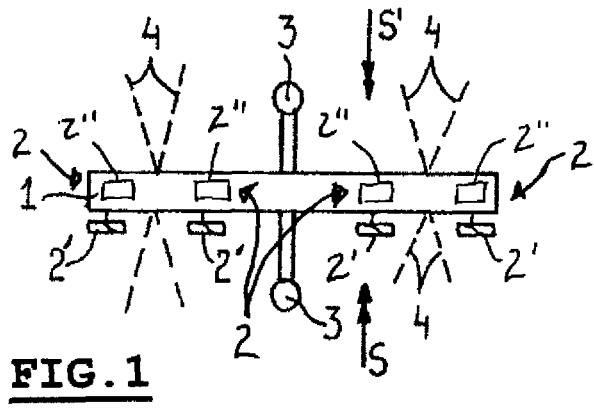
FIG. 1 schematically shows a top plan view of a state of the art assembly.

Firstly referring to FIG. 1 a state of the art assembly for generating energy from sea currents (indicated by arrows S or S') is illustrated schematically in a top plan view. It comprises a main floating body 1 to be oriented across the direction of the sea current. This main floating body 1 may, for example, be constructed as a hollow, substantially tubular body.

Rotor assemblies 2 depend from said main floating body 1. These rotor assemblies 2 include rotating members 2' that are rotated by the sea current and may drive a generator 2'' for electrical power, for example. Many types of rotor assemblies 2 are conceivable, for example having a vertical axis of rotation for the rotating member 2' or a horizontal axis of rotation for the rotating member 2'. The manner in which the rotor assemblies 2 are connected to the main floating body may be conventional and has no bearing on the present invention and, thus, is not further detailed here.

Because the rotating members 2' experience current induced drag forces striving to rotate the main floating body 1 around a horizontally extending lengthwise axis and because such a rotation would be detrimental for the operational efficiency of the assembly (specifically of the rotor assemblies 2), stabilising members 3 extending substantially sideways from the main floating body 1 are provided which in the present case are located halfway the length of the main floating body 1 and extend therefrom in opposite directions. These stabilising members may come in many shapes (as is known per se in the respective field), such as open tubular bodies or buoyant bodies.

Finally the assembly comprises mooring lines 4 which may be provided in pairs and which are meant for anchoring the assembly, for example to the sea bed.

Although the stabilising members 3 may effectively reduce drag induced rotations of the main floating body 1, due to their mass and area engaged by the sea current severe bending stresses are caused in said main floating body 1 (with, in the illustrated state of the art embodiment, a peak at the location of the stabilising members) when the latter is subjected to reciprocating movements caused by waves, among others. These bending stresses require a stronger and thus heavier main floating body.

Figure 2:
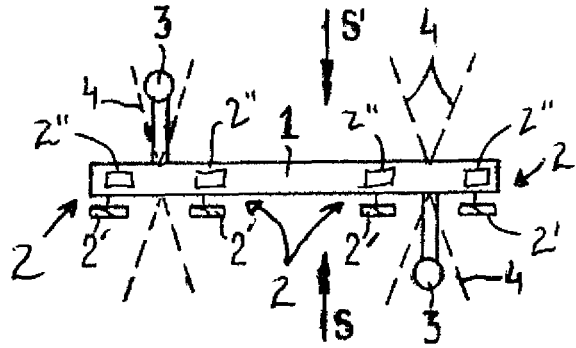
FIG. 2 schematically shows a top plan view of a first embodiment of the assembly.

FIG. 2 illustrates, in a similar manner, a first embodiment of the assembly according to the present invention. It likewise comprises a main floating body 1, rotor assemblies 2, stabilising members 3 and mooring lines 4. Now, however, each stabilising member 3 is attached to the main floating body 1 at a position substantially corresponding with the position of attachment of a mooring line 4.

Figure 3:
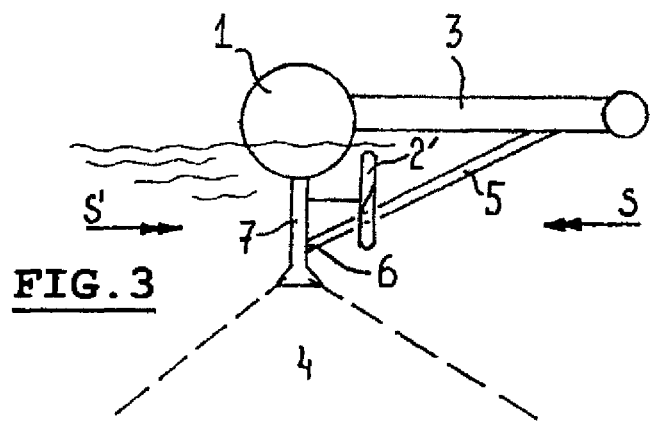
FIG. 3 on a larger scale, schematically shows an elevational view of a slightly amended second embodiment of the assembly.

It is noted that the correspondence in position occurs in the lengthwise direction of the main floating body 1 and not necessarily in other directions. For example it is conceivable that the mooring lines 4 are attached to the main floating body at a lower level than the stabilising members 3, at a height substantially corresponding with the imaginary resulting center of drag forces acting on the assembly due to the sea current, as illustrated in FIG. 3.

As a result of the specific lengthwise location of the stabilising members 3 with respect to the mooring lines 4 the bending stresses in the main floating body 1 may be reduced dramatically because the location where forces caused by the stabilising member are introduced into the main floating body 1 substantially coincides with the location where forces caused by the respective mooring line 4 are introduced into the main floating body 1.

As a further advantage of the inventive concept the stabilising member 3 may be used as a constructive member which is part of the means for attaching the mooring line 4 to the main floating body 1, for example using a strut 5 (see FIG. 3) extending between the location 6 where the mooring line 4 is attached to the main floating body 1 (or, more specifically, to a brace 7 depending therefrom) and the stabilising member 3, such that the overall constructional complexity and weight of the main floating body 1 may be reduced.

Figure 4:
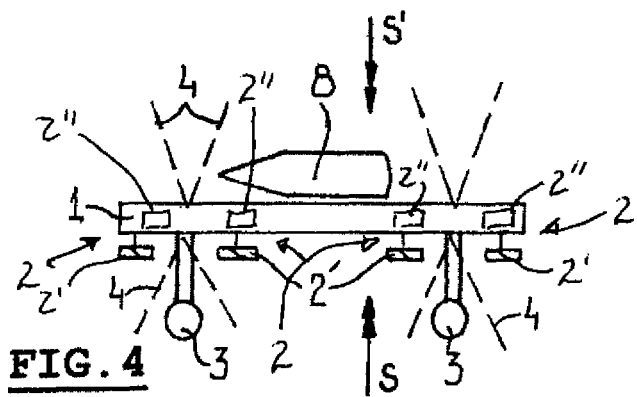
FIG. 4 schematically shows a top plan view of a third embodiment of the assembly.

Although the number and location of the stabilising members 3 may vary, FIG. 4 illustrates an embodiment with two stabilising members 3 which are positioned at or on the same side of the main floating body 1. As a result the opposite side of the main floating body 1 remains free from obstacles and may be approached by a vessel 8.

Figure 5:
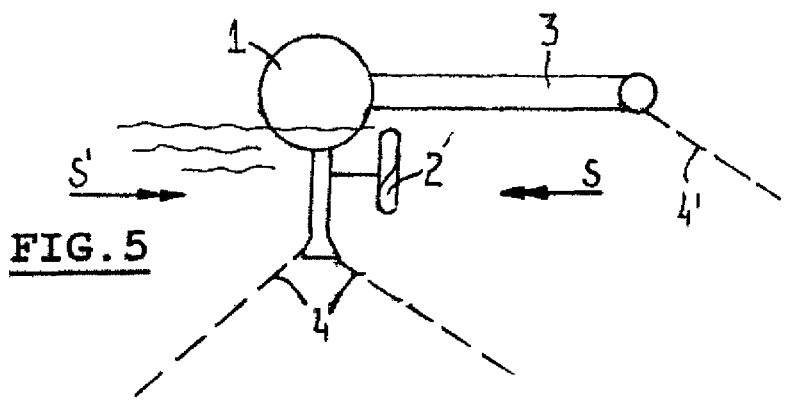
FIG. 5, on a larger scale, schematically shows an elevational view of a fourth embodiment of the assembly.

According to an embodiment illustrated in FIG. 5 an additional mooring line 4' is directly attached to a stabilising member 3 to further improve the stability of the assembly. The right one of the mooring lines 4 in FIG. 5 could be omitted then.

Figure 6:
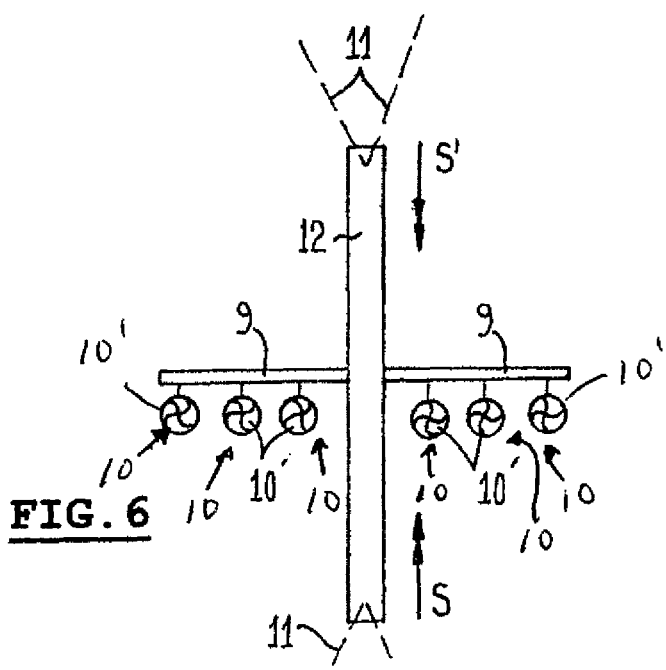
FIG. 6 schematically shows a top plan view of a fifth embodiment of the assembly.

Finally FIG. 6 shows an alternative embodiment of the assembly for generating energy from sea currents. It comprises a main floating body 12 to be oriented in parallel to the direction of the sea current, at least two outriggers 9 extending substantially sideways in opposite directions from the main floating body 12, rotor assemblies 10 (having, in this embodiment, a vertical axis of rotation of rotating members 10') depending from said outriggers 9 and mooring lines 11 for anchoring the assembly. Said mooring lines 11 are attached to the main floating body 12 at or near the opposite frontal ends thereof. These mooring lines 11 may be provided in pairs or alone. For an improved stability they may be attached to the main floating body 12 at a lower level than the outriggers 9 and, if provided in pairs, may be attached to the main floating body 12 at slightly spaced locations.

In this embodiment the main floating body 12 itself acts as main stabilising member, and as such the location of the stabilising member and mooring lines 11 coincides (in the 'lengthwise direction' as defined by the extension of the outriggers 9). The outriggers 9 also may have a certain degree of buoyancy to provide an increased stability around the longitudinal axis of the main floating body 12.

The invention is not limited to the embodiments described before which may be varied widely within the scope of the invention as defined by the appending claims.

The invention claimed is:

1. A floating energy generating assembly, comprising a main floating body comprising a tubular body having a lengthwise axis configured to be oriented across a direction of a sea current, at least one rotor assembly supported by said main floating body and configured to generate energy from sea currents, at least one stabilising member extending substantially sideways from the main floating body, and mooring lines directly coupled to the main floating body to anchor the assembly, wherein each stabilising member is attached to the main floating body at a position substantially corresponding with the position of attachment of a mooring line.

2. The assembly according to claim 1, comprising at least two stabilising members.

3. The assembly according to claim 2, wherein the stabilising members are positioned on a same side of the main floating body.

4. The assembly according to claim 1, wherein the rotor assembly has a rotating member disposed in the sea current and configured to rotate about a horizontal axis of rotation when the assembly is floating.

5. the assembly according to claim 1 and further comprising a second rotor assembly supported by said main floating body and configured to generate energy from sea currents when the assembly is floating.

6. The assembly according to claim 1, and wherein the main floating body has a lengthwise direction.

7. The assembly according to claim 6, and wherein the main floating body is elongated in the lengthwise direction.

8. The assembly according to claim 1, wherein the at least one stabilising member is buoyant.

9. The assembly according to claim 1, and wherein the main floating body is shaped as a tubular body.

10. A floating assembly, comprising a main floating body, at least one rotating member disposed in sea currents and supported by said main floating body and configured to be rotated by the sea currents when the assembly is floating, at least one stabilising member extending substantially sideways from the main floating body, and mooring lines directly coupled to the main floating body to anchor the assembly, wherein each stabilising member is attached to the main floating body at a position substantially corresponding with the position of attachment of a mooring line.

11. The assembly according to claim 10, comprising at least two stabilising members.

12. The assembly according to claim 11, wherein the stabilising members are positioned at the same side of the main floating body.

13. The assembly according to claim 10, wherein the rotating member is configured to rotate about a horizontal axis of rotation when the assembly is floating.

14. The assembly according to claim 10, and wherein the main floating body is shaped as a tubular body.

15. The assembly according to claim 10, wherein the at least one stabilising member is buoyant.

16. The assembly according to claim 10, and wherein the main floating body has a lengthwise direction.

17. The assembly according to claim 16, and wherein the main floating body is elongated in the lengthwise direction.

\* \* \* \* \*